United States Patent
Tsai

(10) Patent No.: US 7,725,986 B2
(45) Date of Patent: Jun. 1, 2010

(54) CASTOR THAT IS OPERATED SMOOTHLY AND CONVENIENTLY

(76) Inventor: Po-Chuan Tsai, 226-16, Zhung Zhou, Zhungsheng Cun, Rende Hsiang, Tainan Hsien (TW)

( * ) Notice: Subject to any disclaimer, the term of this patent is extended or adjusted under 35 U.S.C. 154(b) by 670 days.

(21) Appl. No.: 11/651,884

(22) Filed: Jan. 10, 2007

(65) Prior Publication Data

US 2008/0163455 A1 Jul. 10, 2008

(51) Int. Cl.
*A47B 91/00* (2006.01)
(52) U.S. Cl. ............................................... 16/46; 16/47
(58) Field of Classification Search ................. 16/18 R, 16/45, 46, 47, 48, 22; 301/5.1, 5.23, 5.301, 301/5.306, 5.309, 7, 13.2, 5.7
See application file for complete search history.

(56) References Cited

U.S. PATENT DOCUMENTS

| | | | | |
|---|---|---|---|---|
| 2,476,193 A * | 7/1949 | Hirschmugl | ................ | 301/5.7 |
| 3,997,938 A * | 12/1976 | Pinaire et al. | .................. | 16/45 |
| 4,113,328 A * | 9/1978 | Vander Meulen | ........... | 384/482 |
| 4,122,580 A * | 10/1978 | Black | ............................. | 16/46 |
| 5,068,943 A * | 12/1991 | Estkowski et al. | .......... | 16/18 A |
| 5,075,924 A * | 12/1991 | Estkowski et al. | .......... | 16/18 A |
| 5,119,525 A * | 6/1992 | Melara | ....................... | 16/18 R |
| 5,230,571 A * | 7/1993 | Estkowski et al. | .......... | 384/560 |
| 5,409,316 A * | 4/1995 | Ferguson | .................... | 384/447 |
| 687,838 A1 | 12/2001 | Keiper | | |
| 6,748,623 B1 * | 6/2004 | Tsai | ............................... | 16/47 |
| 6,839,939 B2 * | 1/2005 | Donakowski | .................. | 16/45 |
| 7,150,070 B2 * | 12/2006 | Donakowski | .................. | 16/45 |

* cited by examiner

*Primary Examiner*—Chuck Y. Mah
(74) *Attorney, Agent, or Firm*—Alan Kamrath; Kamrath & Associates PA

(57) ABSTRACT

A castor includes a main body, two rollers, a plurality of rolls, two retaining members, and two covers. Thus, the rolls are rotatably mounted between the main body and the respective roller, so that each of the rollers is rotatable on the main body smoothly. In addition, the rolls and the rollers are made of the same material to reduce the friction between the rolls and the rollers during rotation of the castor, so that the rolls and the rollers are not easily worn out during a long-term utilization. Further, the rollers are covered by the covers so that only the through hole of the main body is exposed outwardly from the covers and the rollers, thereby enhancing the aesthetic quality of the castor.

19 Claims, 5 Drawing Sheets

CASTOR THAT IS OPERATED SMOOTHLY AND CONVENIENTLY

BACKGROUND OF THE INVENTION

1. Field of the Invention

The present invention relates to a castor and, more particularly, to a castor for a chair.

2. Description of the Related Art

A conventional castor for a chair in accordance with the prior art shown in FIG. 4 comprises a rotation body 10 provided with a connecting tube 11 pivotally mounted on a leg (not shown) of a chair, a shaft 12 extended through the rotation body 10, and two rollers 13 mounted on the shaft 12 and combined with the rotation body 10. However, the shaft 12 made of metal and the rollers 13 made of plastic material are made of different materials to increase the friction between the shaft 12 and the rollers 13 during rotation of the rollers 13, so that the rollers 13 are easily worn out during a long-term utilization. In addition, the rollers 13 are not rotatable on the shaft 12 smoothly.

Another conventional castor for a chair in accordance with the prior art shown in FIG. 5 was disclosed in U.S. Pat. No. 687,838 and comprises a rotation body 23 provided with a connecting tube 24 pivotally mounted on a leg (not shown) of a chair, a shaft 22 extended through the rotation body 23, two rollers 20 mounted on the shaft 22 and combined with the rotation body 23, and a plurality of rolling balls 21 mounted in the rollers 20 to facilitating rotation of the rollers 20. However, the rolling balls 21 made of metal and the rollers 20 made of plastic material are made of different materials to increase the friction between the rolling balls 21 and the rollers 20 during rotation of the rollers 20, so that the rollers 20 are easily worn out during a long-term utilization. In addition, the rolling balls 21 are made of metal so that the rolling balls 21 are easily rusted during a long-term utilization.

BRIEF SUMMARY OF THE INVENTION

In accordance with the present invention, there is provided a castor, comprising a main body having two opposite mounting portions, an upright post pivotally mounted on the main body, two rollers each rotatably mounted on a respective mounting portion of the main body, a plurality of rolls rotatably mounted between a respective mounting portion of the main body and a respective roller, two retaining members each secured on a respective mounting portion of the main body and each rested on a respective roller to retain the respective roller on the respective mounting portion of the main body, and two covers each mounted on a respective roller to cover the respective roller.

The primary objective of the present invention is to provide a castor that is operated smoothly and conveniently.

Another objective of the present invention is to provide a castor, wherein the rolls are rotatably mounted between the main body and the respective roller, so that each of the rollers is rotatable on the main body smoothly, thereby facilitating operation of the castor.

A further objective of the present invention is to provide a castor, wherein the rolls and the rollers are made of the same material to reduce the friction between the rolls and the rollers during rotation of the castor, so that the rolls and the rollers are not easily worn out during a long-term utilization.

A further objective of the present invention is to provide a castor, wherein the main body, the upright post, the rollers, the retaining members, the covers and the rolls are made of a plastic material, so that the castor will not be rusted during a long-term utilization.

A further objective of the present invention is to provide a castor, wherein the rollers are covered by the covers so that only the through hole of the main body is exposed outwardly from the covers and the rollers, thereby enhancing the aesthetic quality of the castor.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
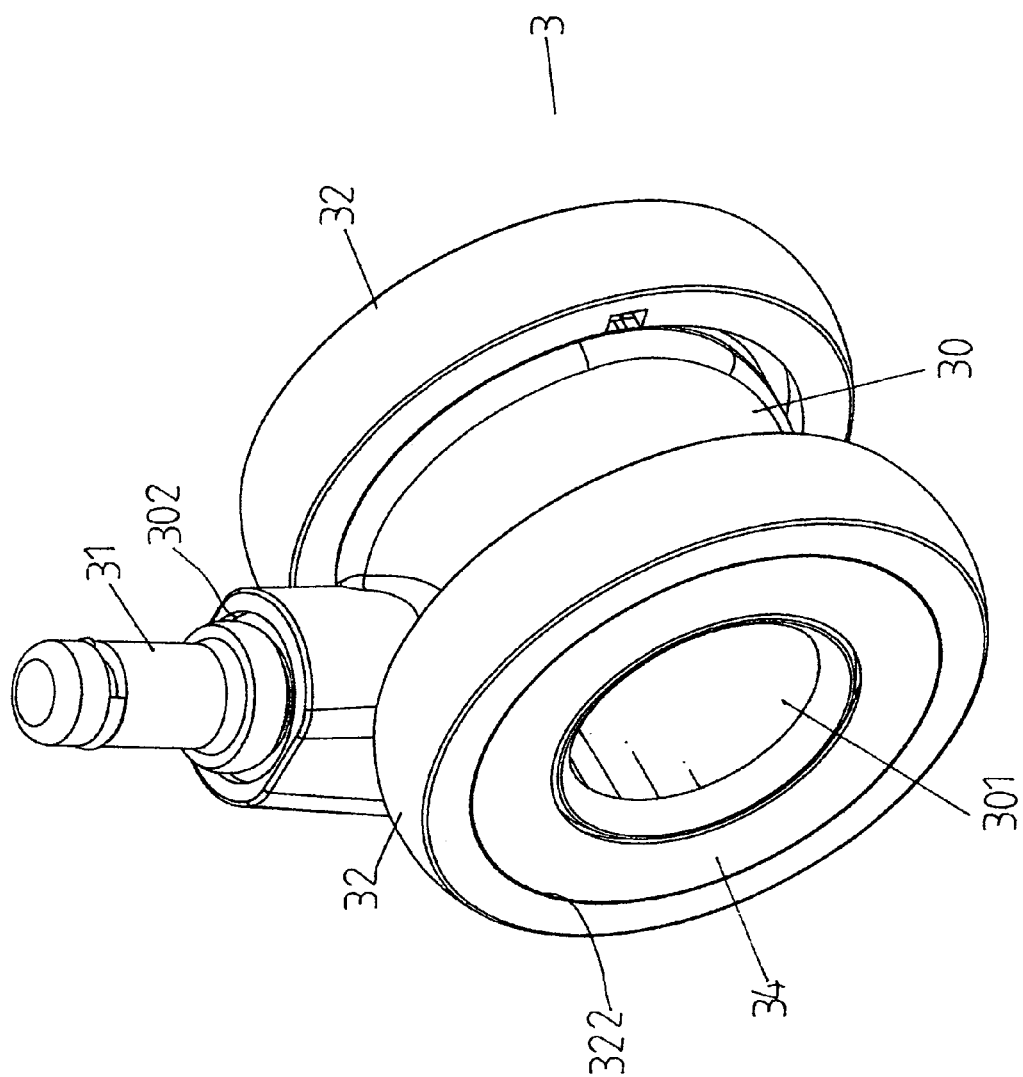
FIG. 1 is a perspective view of a castor in accordance with the preferred embodiment of the present invention.
Figure 2:
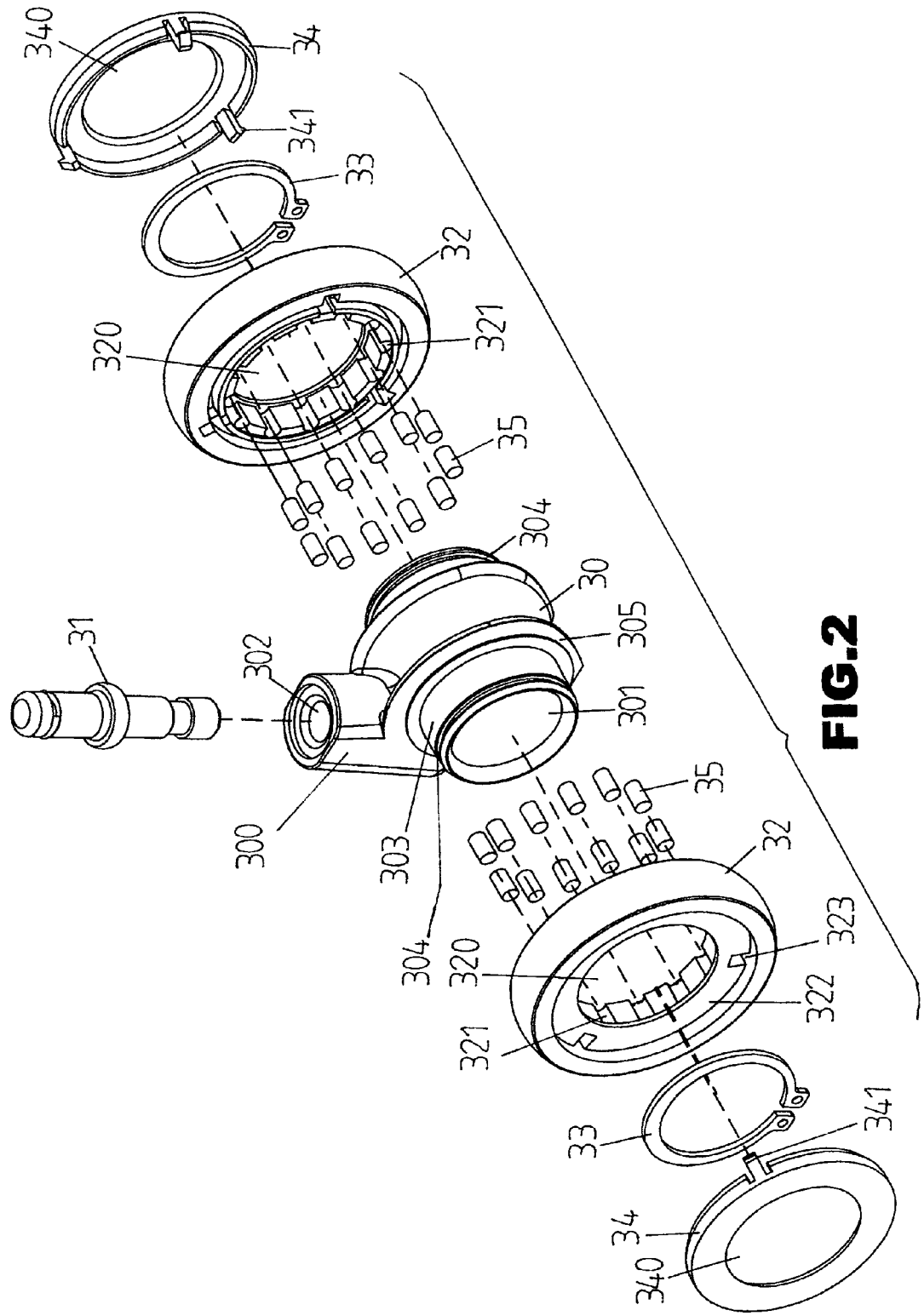
FIG. 2 is an exploded perspective view of the castor as shown in FIG. 1.
Figure 3:
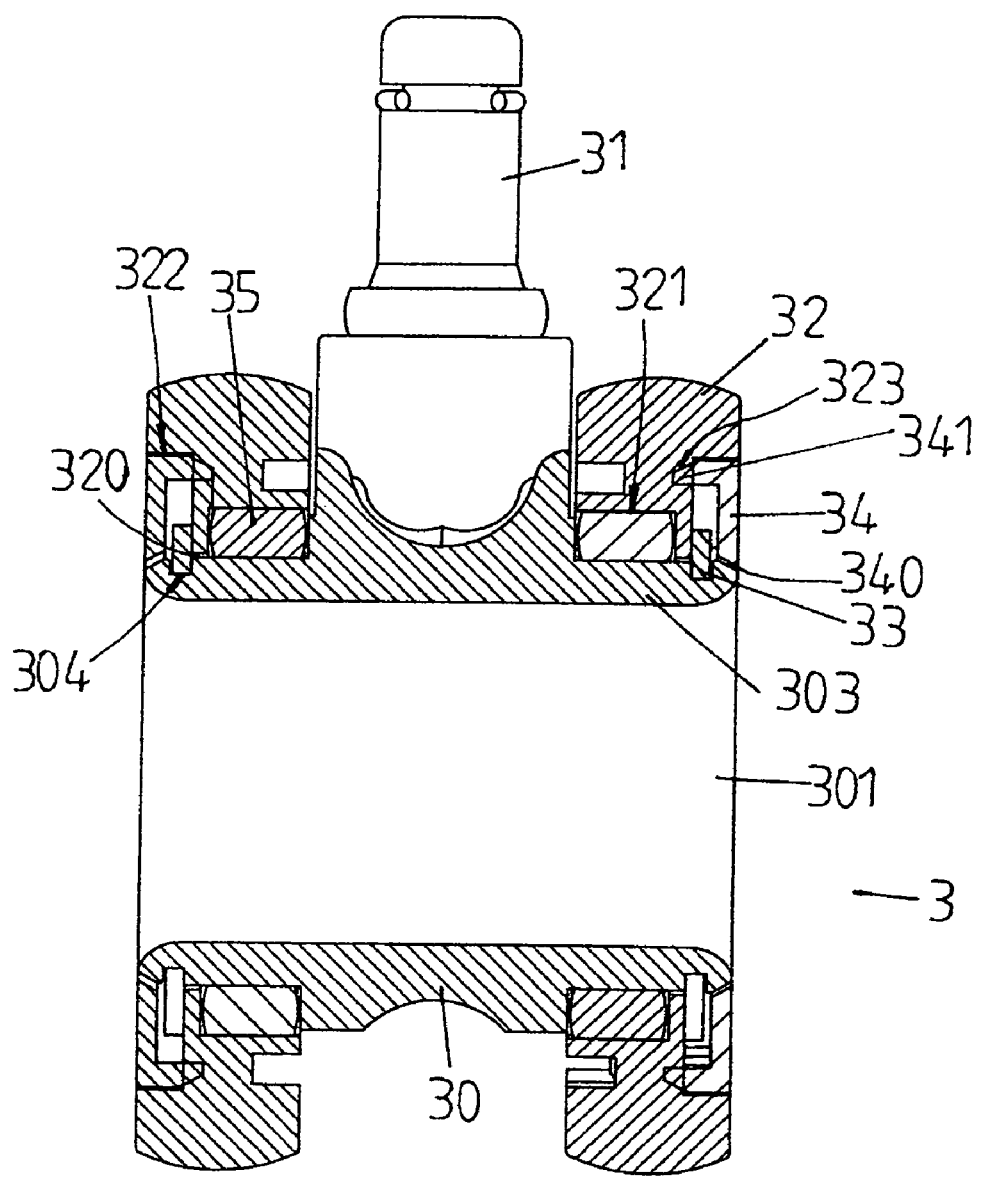
FIG. 3 is a side cross-sectional view of the castor as shown in FIG. 1.
Figure 4:
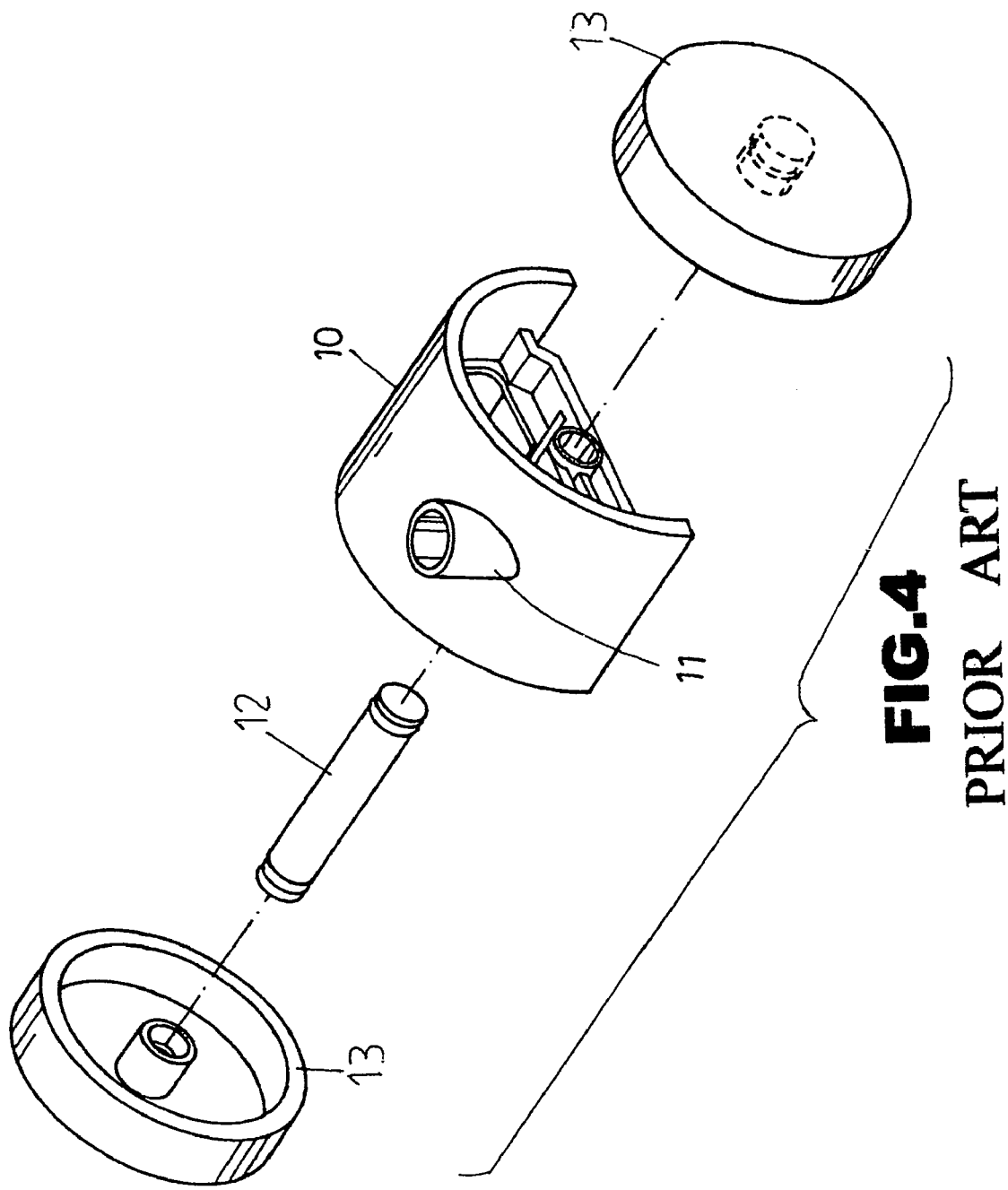
FIG. 4 is an exploded perspective view of a conventional castor in accordance with the prior art.
Figure 5:
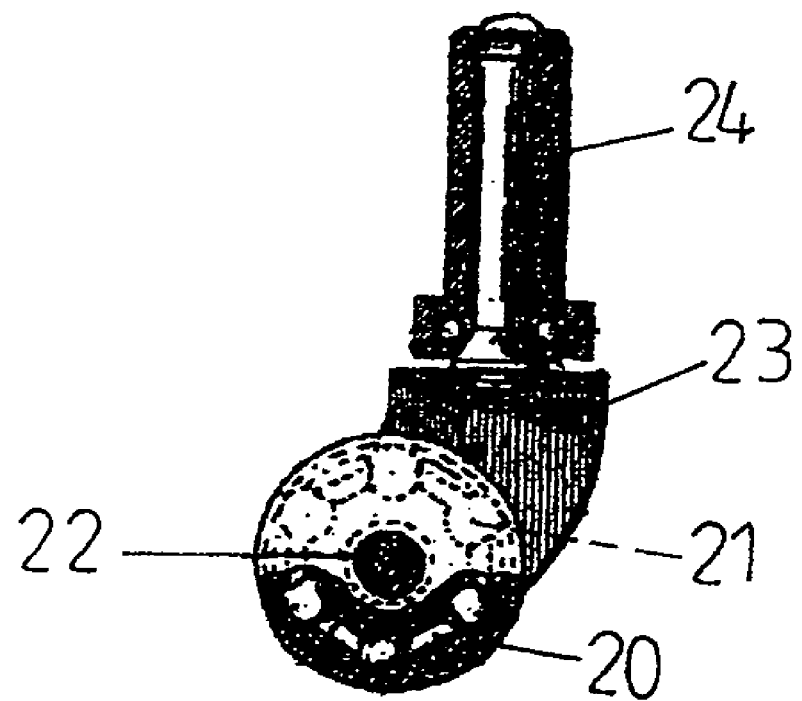
FIG. 5 is a side view of another conventional castor in accordance with the prior art.

Referring to FIGS. 1-3, a castor 3 for a chair in accordance with the preferred embodiment of the present invention comprises a main body 30 having two opposite mounting portions 303, an upright post 31 pivotally mounted on the main body 30, two rollers 32 each rotatably mounted on a respective mounting portion 303 of the main body 30, a plurality of rolls 35 rotatably mounted between a respective mounting portion 303 of the main body 30 and a respective roller 32, two retaining members 33 each secured on a respective mounting portion 303 of the main body 30 and each rested on a respective roller 32 to retain the respective roller 32 on the respective mounting portion 303 of the main body 30, and two covers 34 each mounted on a respective roller 32 to cover the respective roller 32.

In the preferred embodiment of the present invention, the main body 30, the upright post 31, the rollers 32, the retaining members 33, the covers 34 and the rolls 35 are made of a non-metallic material, such as a plastic material.

The main body 30 has an inside formed with a through hole 301 which extends axially through a whole length of the main body 30. The main body 30 has a periphery formed with an upright stud 300 having an inside formed with a mounting hole 302 mounted on the upright post 31. The upright stud 300 of the main body 30 is located between the mounting portions 303. The mounting portions 303 are protruded outwardly from two opposite sides of the main body 30 and extend in an axial direction of the main body 30. Each of the mounting portions 303 of the main body 30 has a distal end formed with a retaining groove 304.

Each of the rollers 32 has a first side formed with a plurality of substantially arc-shaped rolling grooves 321 to receive the rolls 35 and a second side formed with a recess 322 to receive a respective cover 34. The first side of each of the rollers 32 is rested on a respective protruding shoulder 305 of the main body 30. The recess 322 of each of the rollers 32 has a peripheral wall formed with a plurality of locking slots 323. Each of the rollers 32 has an inside side formed with a central hole 320 mounted on a respective mounting portion 303 of the main body 30 and located between the rolling grooves 321 and the recess 322.

Each of the retaining members 33 is a substantially C-shaped snap ring. Each of the retaining members 33 is rested on the second side of a respective roller 32 and is retained in the retaining groove 304 of a respective mounting portion 303 of the main body 30.

Each of the covers 34 is rested on and flush with the second side of the respective roller 32 to cover the recess 322 of the respective roller 32 so that only the through hole 301 of the main body 30 is exposed outwardly from the covers 34 and the rollers 32. Each of the covers 34 has an inside side formed with a central hole 340 mounted on a respective mounting portion 303 of the main body 30. Each of the covers 34 has a peripheral wall formed with a plurality of protruding locking hooks 341 locked in the locking slots 323 of the recess 322 of a respective roller 32.

Accordingly, the rolls 35 are rotatably mounted between the main body 30 and the respective roller 32, so that each of the rollers 32 is rotatable on the main body 30 smoothly, thereby facilitating operation of the castor. In addition, the rolls 35 and the rollers 32 are made of the same material to reduce the friction between the rolls 35 and the rollers 32 during rotation of the castor, so that the rolls 35 and the rollers 32 are not easily worn out during a long-term utilization. Further, the main body 30, the upright post 31, the rollers 32, the retaining members 33, the covers 34 and the rolls 35 are made of a plastic material, so that the castor will not be rusted during a long-term utilization. Further, the rollers 32 are covered by the covers 34 so that only the through hole 301 of the main body 30 is exposed outwardly from the covers 34 and the rollers 32, thereby enhancing the aesthetic quality of the castor.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor, comprising:
   a main body having two opposite mounting portions;
   an upright post pivotally mounted on the main body;
   two rollers each rotatably mounted on a respective mounting portion of the main body;
   a plurality of rolls rotatably mounted between a respective mounting portion of the main body and a respective roller;
   two retaining members each secured on a respective mounting portion of the main body and each rested on a respective roller to retain the respective roller on the respective mounting portion of the main body;
   two covers each mounted on a respective roller to cover the respective roller;
   wherein each of the rollers has a first side formed with a plurality of substantially arc-shaped rolling grooves to receive the rolls.

2. The castor in accordance with claim 1, wherein the main body, the upright post, the rollers, the retaining members, the covers and the rolls are made of a non-metallic material.

3. The castor in accordance with claim 2, wherein the main body, the upright post, the rollers, the retaining members, the covers and the rolls are made of a plastic material.

4. The castor in accordance with claim 1, wherein the rolls and the rollers are made of the same material.

5. The castor in accordance with claim 1, wherein each of the mounting portions of the main body has a distal end formed with a retaining groove, and each of the retaining members is retained in the retaining groove of a respective mounting portion of the main body.

6. The castor in accordance with claim 1, wherein each of the rollers has a second side formed with a recess to receive a respective cover.

7. The castor in accordance with claim 6, wherein each of the rollers has an inside side formed with a central hole mounted on a respective mounting portion of the main body.

8. The castor in accordance with claim 7, wherein the central hole of each of the rollers is located between the rolling grooves and the recess.

9. The castor in accordance with claim 6, wherein the recess of each of the rollers has a peripheral wall formed with a plurality of locking slots, and each of the covers has a peripheral wall formed with a plurality of protruding locking hooks locked in the locking slots of the recess of a respective roller.

10. The castor in accordance with claim 6, wherein each of the retaining members is rested on the second side of a respective roller.

11. The castor in accordance with claim 6, wherein each of the covers is rested on and flush with the second side of the respective roller to cover the recess of the respective roller, so that the rollers are covered by the covers.

12. The castor in accordance with claim 11, wherein the main body has an inside formed with a through hole.

13. The castor in accordance with claim 12, wherein the through hole of the main body is exposed outwardly from the covers and the rollers and extends axially through a whole length of the main body.

14. The castor in accordance with claim 12, wherein the main body has a periphery formed with an upright stud having an inside formed with a mounting hole mounted on the upright post.

15. The castor in accordance with claim 14, wherein the upright stud of the main body is located between the mounting portions.

16. The castor in accordance with claim 1, wherein the first side of each of the rollers is rested on a respective protruding shoulder of the main body.

17. The castor in accordance with claim 1, wherein each of the retaining members is a substantially C-shaped snap ring.

18. The castor in accordance with claim 1, wherein each of the covers has an inside side formed with a central hole mounted on a respective mounting portion of the main body.

19. The castor in accordance with claim 1, wherein the mounting portions are protruded outwardly from two opposite sides of the main body and extend in an axial direction of the main body.

* * * * *